July 26, 1966

J. L. REIF 3,263,034

ROTARY SWITCHING APPARATUS FOR DISCRETELY ENERGIZING
SUCCESSIVE CIRCUITS

Filed Sept. 14, 1964

INVENTOR.
JACK L. REIF

BY
Howard Keiser
John F. Verhoeven
ATTORNEYS

July 26, 1966 J. L. REIF 3,263,034
ROTARY SWITCHING APPARATUS FOR DISCRETELY ENERGIZING
SUCCESSIVE CIRCUITS
Filed Sept. 14, 1964 5 Sheets-Sheet 4

United States Patent Office 3,263,034
Patented July 26, 1966

3,263,034
ROTARY SWITCHING APPARATUS FOR DISCRETELY ENERGIZING SUCCESSIVE CIRCUITS
Jack L. Reif, Milford, Ohio, assignor to The Cincinnati Milling Machine Co., Cincinnati, Ohio, a corporation of Ohio
Filed Sept. 14, 1964, Ser. No. 396,066
4 Claims. (Cl. 200—11)

The present invention relates to rotary switching apparatus.

In the rotary switch of typical switching apparatus, a circle of studs defining stationary contacts, is engaged, one stud after another, by a rotatable switch element sweeping around the circle to define a movable contact. Each stud may be connected to a different circuit (or circuit branch), and the movable contact may be connected to a source of electrical energy, so that as the movable contact sweeps over the circle of stationary contacts, the circuits (or circuit branches) are successively energized. In high speed switches of this type, it is highly desirable that the movable contact element be supported at all times, as by the studs when the movable element bridges the studs. This is preferable because the movable contact element is biased into contact with the studs for good electrical conduction and, if the movable contact is momentarily unsupported during high speed operations, it is subjected to a sharp impact when it engages the next stud. Thus, if unsupported at any time during high speed operation, the movable contact element would receive a series of harmful blows, setting up vibrations which are conducive to short life and erratic operation.

When the movable contact bridges two adjacent studs as it moves from one of these studs to the other during rotation around the circle of studs, two circuits (or circuit branches are momentarily energized at the same time. Ordinarily, this causes no difficulty but, occassionally, it is necessary to provide successive energization of a plurality of circuits (or circuit branches) without any overlap and, indeed, sometimes it is necessary, between energization of successive circuits or branches, that no circuit or branch be energized for a predetermined time interval. This can conveniently be accomplished by connecting circuits (or circuit branches) only to alternate studs unless, as is sometimes the case, the periods when no circuit or branch is energized must be very short. One solution to this latter problem would be to make the alternate "dead" studs very small compared to the "live" studs, but this solution presents difficult fabrication problems which are best avoided. Another possible solution is to inject an insulating material, such as a plastic material, between closely spaced "live" studs so that the plastic will support the moving contact as it sweeps from one stud to the next, holding the contact momentarily out of contact with both studs. The difficulty with this solution is that the movable contact picks up minute particles of the plastic material, tending to smear this material on the "live" studs, thereby impairing the conductivity between the movable and stationary contacts.

In the present invention, switching apparatus is disclosed in which very short periods, when no circuit or branch is energized, occur between periods when circuits (or circuit branches) are energized. This is accomplished through a movable element having a pair of spaced apart contact zones supported at all times by the studs, which are alternately "live" and "dead." In the preferred form of the present invention two circuit branches are provided through the rotary switch, one branch opening (or becoming ineffective) shortly before the other branch closes (or is rendered effective). Or, alternately, with the rotary switch of the present invention, momentary energization of successive circuits, or circuit branches, interspersed with longer periods when no circuit or branch is energized, can be effected if desired.

It is therefore one object of the present invention to provide improved rotary switching apparatus. It is another object of the present invention to provide improved switching apparatus with a rotary switch to energize discretely, a plurality of circuits, or circuit branches, without overlap. It is yet another object of the present invention to provide improved high speed switching apparatus having a rotary switch with which a plurality of circuits, or circuit branches, are energized successively with a short predetermined period before energization of each circuit when no circuit is energized. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figures 1, 2:
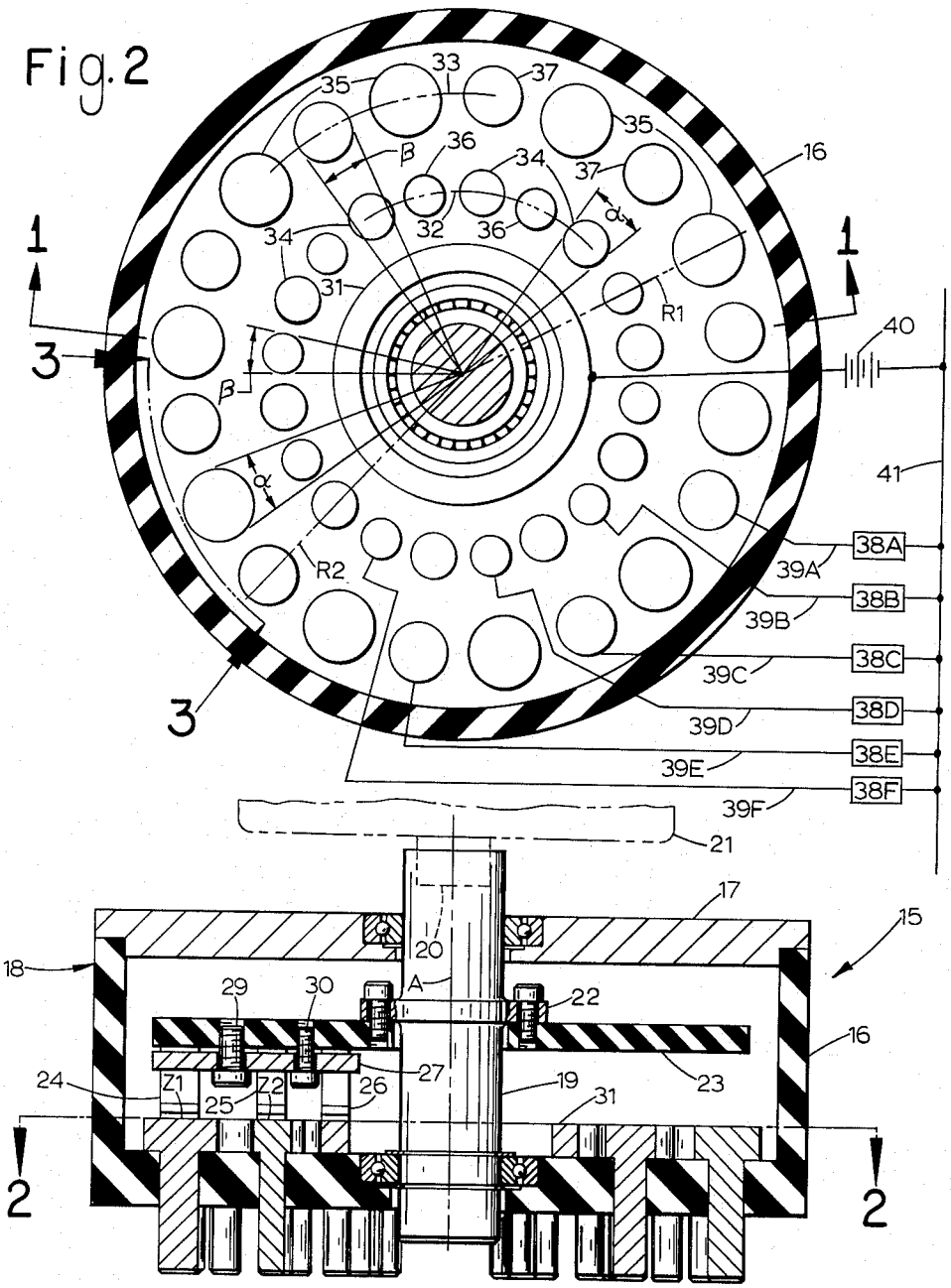
FIG. 1 is a side view, in cross section, through the line 1—1 of the rotary switch of switching apparatus constructed in accordance with the present invention.
FIG. 2 is a view taken on the line 2—2 of FIG. 1.
Figure 3:
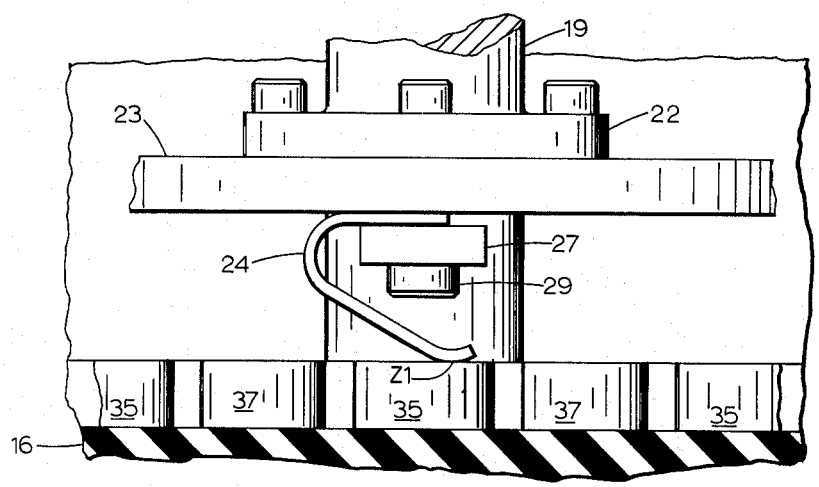
FIG. 3 is a view taken on the line 3—3 of FIG. 2.

There is shown in FIGS. 1, 2, and 3 switching apparatus for energizing a plurality of circuit branches one at a time, for a discrete time interval each, with a briefer time interval between energization of successive circuit branches. A rotary switch, indicated generally at 15, has a cup-shaped base member 16 (made of electrically insulating material) and a cover 17 therefor which together define a housing 18. A rotor shaft 19, journaled in the housing for rotation in axis A, is connected to the output shaft 20 of a motor 21. Rotor shaft 19 has a flange 22 to which is secured an electrically insulating annular plate 23. Three spaced apart contact fingers 24, 25, and 26 are secured to annular plate 23 by an electrically conducting clamp bar 27 which is connected to annular plate 23 by screws 29 and 30. Plate 23, fingers 24, 25, 26, and bar 27 define a rotatable switch element which cooperate with stationary switch elements mounted in base member 16.

A ring 31 is secured to base member 16 in centered relation with axis A. Two circles 32 and 33 of stationary studs are mounted in the base member outside the ring 31 with each circle concentric with the ring. The two circles have the same number of studs, but the circle 33 is larger than the circle 32. Every other stud in each circle (studs 34 in circle 32 and studs 35 in circle 33) is slightly larger than the alternate studs (studs 36 in circle 32 and studs 37 in circle 33). The center of each stud 36 in circle 32 lies on the same radical line R1 as the center of a stud 35 in circle 33, and the center of each stud 34 in circle 32 lies on the same radial line R2 as the center of a stud 37 in circle 33. In other words the large and small studs of one circle are in staggered relation, respectively, with the large and small studs of the other circle. The studs 34 of circle 32 and studs 35 of circle 33 are the same angular span α, and the studs 36 of circle 32 and studs 37 of circle 33 are the same circular span β. The angular span α is slightly larger than the angular span β so that larger studs of one circle are in overlapping relation with the studs in the other circle radially aligned therewith (the smaller studs). The staggered overlapping relation of the larger studs with respect to the smaller studs is indicated schematically in FIG. 4.

The three spaced apart contact fingers 24, 25, and 26 (which are electrically connected together by virtue of conducting clamp bar 27) are all aligned in the radial direction (as indicated in FIG. 3) and engaged, respectively, with circle of studs 33, circle of studs 32, and ring 31. At any given instant during rotation of rotor shaft 19, the contacts 24 and 25 are in stud engagement in circles 32 and 33, respectively, on the same radial line R emanating from axis A. Since the studs 34 of circle 32 are the same span as the studs 35 of circle 33, the contact 25 will traverse each stud 34 in the same time as the contact 24 traverses each stud 35. Consequently, blocks 34T and 35T (which represent the time contact fingers 24 and 25 are engaged with each stud 34 and 35, respectively) are shown as being the same size. The studs are shown lying in straight lines instead of circles to simplify the representation. Similarly, the contact 25 will traverse the studs 36 in circle 32 in the same time (indicated by block 36T in FIG. 4) as the contact 24 traverses the studs 37 (indicated by block 37T in FIG. 4) and, for this reason, the blocks 36T and 37T are shown as the same size.

Each of the studs has a shank extending through base member 16 and terminating outside the housing. In the switching apparatus disclosed in FIGS. 1, 2, and 3, a plurality of devices, or loads (only a few of which 38A, 38B, 38C, 38D, 38E, and 38F are shown), are to be energized successively without overlap. More specifically, there must be a brief interval between energization of successive devices when no device is energized. The devices are connected, respectively, in circuit branches 39A, 39B, 39C, 39D, 39E, and 39F. Each circuit branch contains one of the smaller studs (either stud 36 of the inner circle 32 or stud 37 of the outer circle 33). More specifically, the shank of these studs are connected (outside the housing) to the load devices. The switching apparatus network (a portion of which is shown in FIG. 2) contains a source of energy (battery 40) which has one end connected to ring 31 and the other end connected to line 41. Line 41 is connected to the sides of the devices opposite the sides thereof connected to the studs of rotary switch 15. The larger stud (studs 34 of inner circle 32 and studs 35 of outer circle 33) are not connected to the circuit branches, nor the devices. In other words, the studs 36 and 37, which are connected in circuit with the devices, the battery, and the contacts 24, 25, 26, are "live," and the studs 34 and 35, which are not connected in any manner into the network, are "dead." It will be understood that all studs 36, 37 are connected to devices which, in turn, are connected to line 41 to define the complete network of the switching apparatus of this embodiment of the invention.

The circuit branch through the switch defined by contact finger 24 will be closed when the contact is engaged (at contact zone Z1) with a "live" stud 37; the circuit branch through the switch defined by contact finger 25 will be closed when the contact is engaged (at contact zone Z2 which is spaced apart from contact zone Z1) with a "live" stud 36. In either case, current will flow through the circuit defined by battery 40, the ring 31, contact finger 26, bar 27, contact finger 24 or 25, the "live" stud engaged by contact 24 or 25, the device connected to that "live" stud, and the line 41 which is connected to the battery. The circuit branch through the switch defined by contact 24 will be open when the contact is engaged solely with a "dead" stud 35; the circuit branch through the switch defined by contact 25 will be open when the contact is engaged solely with a "dead" stud 34.

Figure 4:
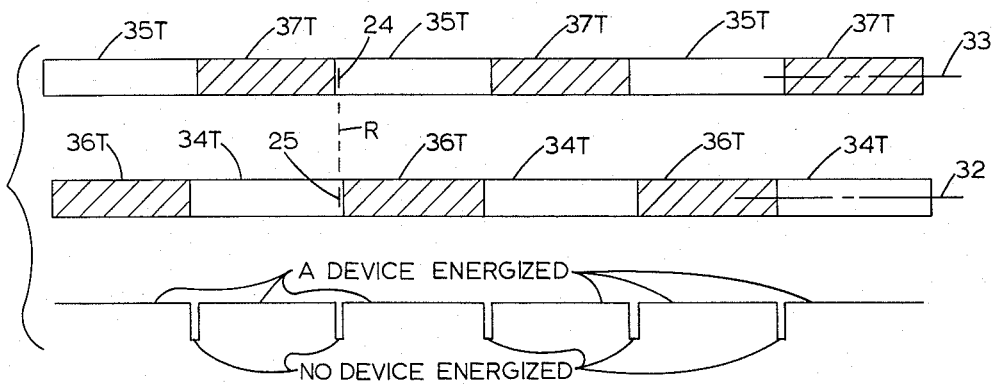
FIG. 4 is a schematic diagram showing the switch contacts and studs of the switch of FIGS. 1, 2, 3, and showing the periods when circuit branches through the switch are closed.

As shown best in FIG. 4, every other stud in circle 32 is a "live" stud (indicated by cross-hatching); alternate studs in circle 32 are "dead" studs. Similarly, every other stud in circle 33 is a "live" stud; alternate studs in circle 33 are "dead" studs. The live studs in circle 32 are in staggered relation to the live studs of circle 33 and the dead studs of circle 32 are in staggered relation to the dead studs of circle 33. In both circles, the dead studs are slightly larger than the live studs and, consequently, there is a slight overlap of dead studs, as previously described. In other words, the radial line R on which the contact points of fingers 24, 25 engage the studs will, at brief, spaced, instants of time, lie on the dead stud 35 of circle 33 at the same time it lies on the dead stud 34 of circle 32 (see FIG. 4). During rotation of the switch element 23 which carries the contacts, the following sequence will occur (assuming clockwise rotation of the contacts): contact 25 will engage a live stud and contact 24 will engage a dead stud to energize (through contact 25) one of the devices, say 38A; contact 25 and contact 24 will, for a brief instant, both engage dead studs (see FIG. 4) and no device will be energized; contact 25 will engage a dead stud and contact 24 will engage a live stud to energize the next successive device, 38B, through contact 24. This sequence of events, which is indicated by the graph in FIG. 4, will continue as long as the rotor shaft rotates. Thus with the switching apparatus of FIGS. 1, 2, 3, and 4, devices are energized in order, discretely, without overlap as indicated in the graph of FIG. 4. Although the size of the studs vary, no very small studs, which are difficult to fabricate and mount, are required. Nor is any plastic insulating material, which can smear onto the stud contacts and impair their conductivity, used.

Figure 7:
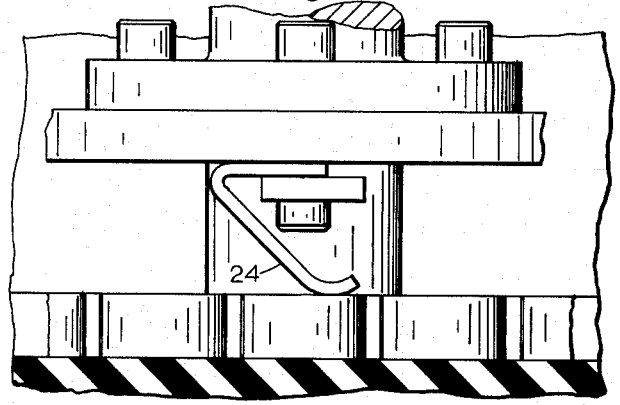
FIG. 7 is a view taken on the line 7—7 of FIG. 6.
Figure 8:
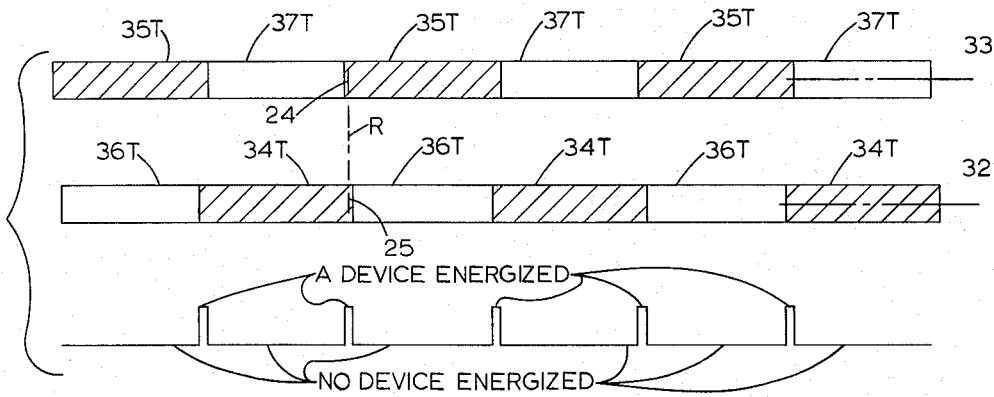
FIG. 8 is a schematic diagram showing the switch contacts and studs of the switch of FIGS. 5, 6, and 7, and showing the periods when circuit branches through the switch are closed.
Figure 6:
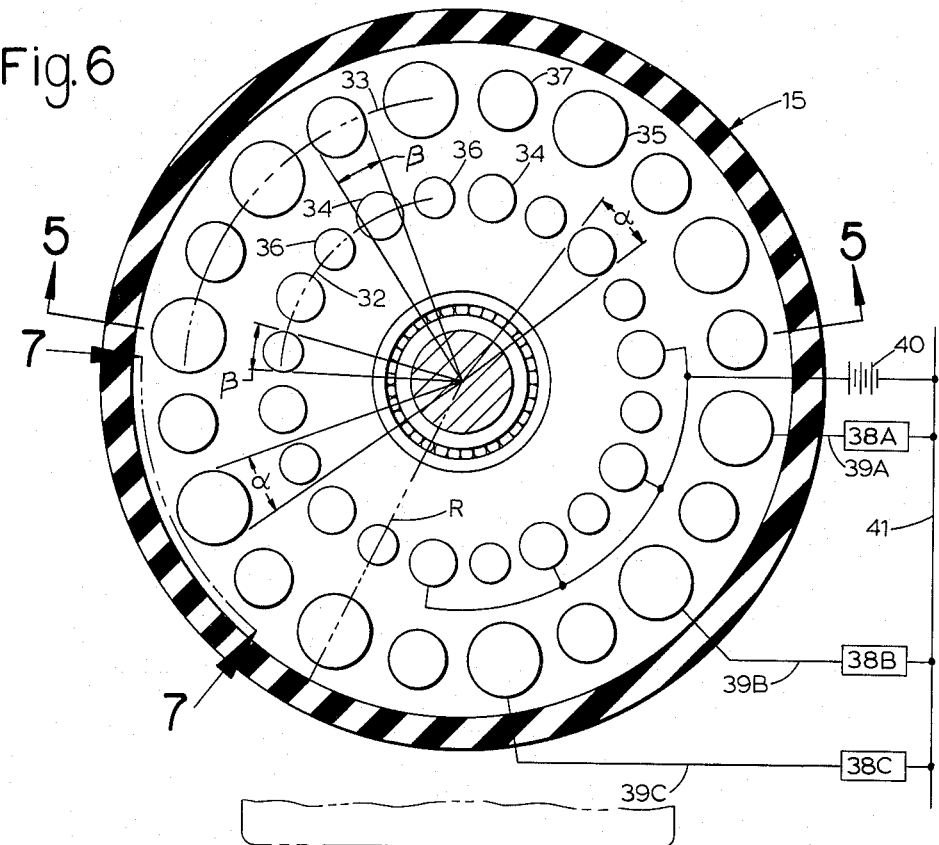
FIG. 6 is a view taken on the line 6—6 of FIG. 5.
Figure 5:
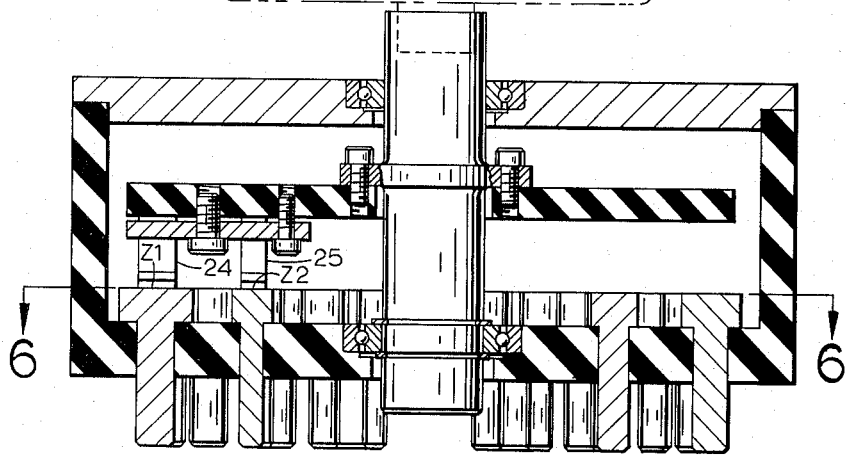
FIG. 5 is a side view, in cross section, through the line 5—5 of the rotary switch of a different embodiment of the present invention.

In the switching apparatus of FIGS. 5, 6, and 7, the devices are energized discretely, each for only a brief instant, with a longer period between energization of devices in which none are energized, as indicated in the graph of FIG. 8. This is accomplished with the rotary switch 15. The ring 31 and contact 26 are not required in this embodiment of the invention and have, accordingly, been omitted from FIGS. 5, 6, 7. The contact zones Z1, Z2 of fingers 24 and 25 lie on the same radial line R at any given instant, as shown in FIG. 8. In this embodiment, one side of the battery 40 is connected to the larger studs 34 of the inner circle 32 of studs (which is every other stud). The smaller, alternate, studs 36 of the inner circle are not connected into the network. The opposite side of the battery is connected to line 41 which is connected to one side of the devices (only a few 38A, 38B, 38C of which are shown). The other sides of the devices are connected, by lines 39A, 39B, 39C, respectively, to the larger studs 35 of the outer circle 33 (which is every other stud of the outer circle). Alternate studs are disconnected from the circuit.

In this embodiment of the invention, contact 24 is engaged with the larger, connected, studs of circle 33 during the time period shown at 35T in FIG. 8; and is engaged with the smaller, disconnected, studs of circle 33 during the time period shown at 37T in FIG. 8. Contact 25 is engaged with the larger, connected, studs of circle 32 during the time period shown at 34T in FIG. 8; and is engaged with the smaller, disconnected, studs of circle 32 during the time period shown at 36T in FIG. 4B. The live studs of circle 32 are in staggered relation to the live studs of circle 33 and the dead studs of circle 32 are therefore also in staggered relation to the dead studs of circle 33. Since the live studs are larger than the dead studs in both circle, the live studs overlap. Thus, the contacts 24 and 25 are both engaged with live studs at the instant they are on the radial line R as shown in FIG. 8. When both contacts 24 and 25 are on live studs, one of the devices (say, 38A) is energized by the circuit defined by the battery 40, stud 34, contact 25, clamp bar 27, contact 24, stud 35, device 38A, and line 41 to the other side of the battery. It will be understood that all studs 34 on the inner circle are connected to one side of the battery and all studs 35 on the outer circle are connected to devices which are connected through line 41 to the other side of the battery. With this network, discrete, brief, energization of successive devices is interspersed with longer periods when no device is energized, as shown in FIG. 8.

Figure 11:
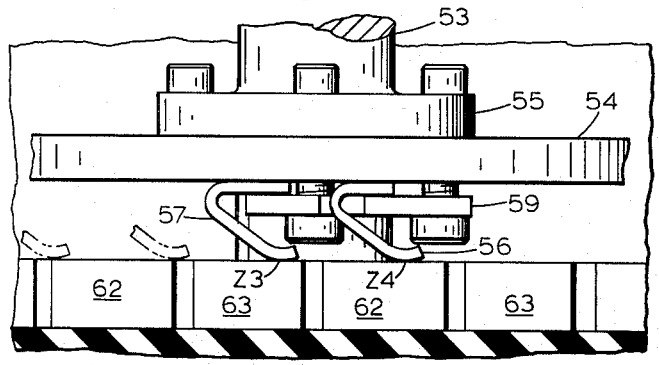
FIG. 11 is a view taken on the line 11—11 of FIG. 10.
Figure 10:
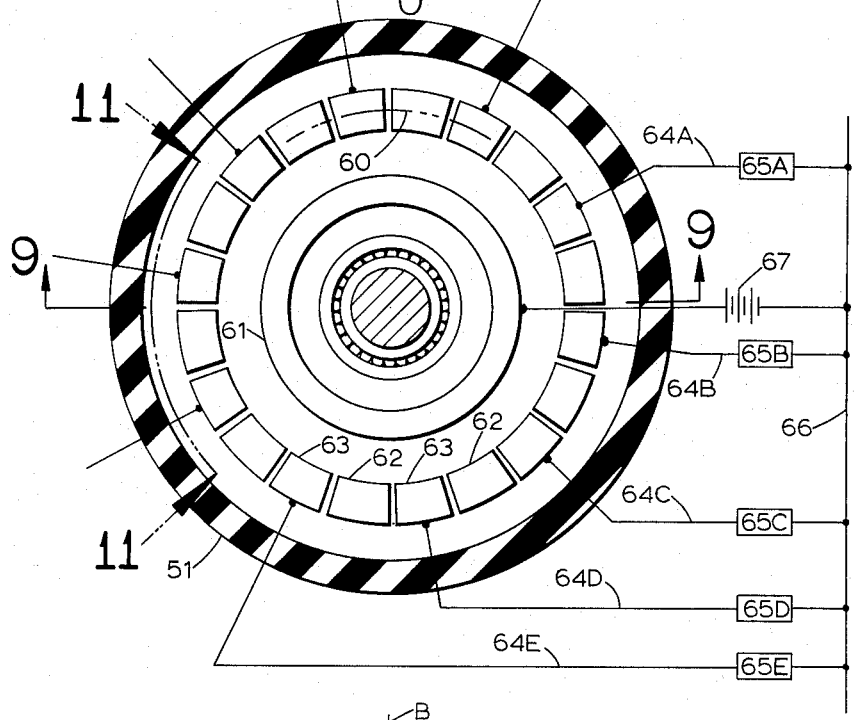
FIG. 10 is a view taken on the line 10—10 of FIG. 9.
Figure 9:
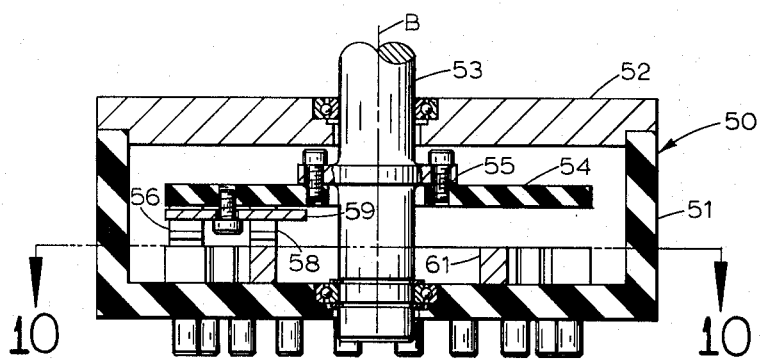
FIG. 9 is a side view, in cross section, through the line 9—9 of the rotary switch of another embodiment of the present invention.

Another embodiment of the present invention is shown in FIGS. 9, 10, and 11. Like the previous embodiments, there is two zone contact within the switch at all times. In this embodiment, however, the two movable contacts simultaneously engage the same circle of studs, instead of two circles of studs. The housing, indicated generally at 50, consists of base member 51 of insulating material and cover 52. Rotor shaft 53 is journaled in the housing. An annular plate 54 of insulating material is connected to flange 55 on the rotor shaft, the three movable contacts 56, 57, 58 are secured to the annular plate 54 by clamp bar 59, which is made of current conducting material. The movable contacts 56 and 57 are of equal distance from the axis B of the rotor shaft (which is driven by a motor, not shown) but are circumferentially spaced, as shown in FIG. 11. Movable contact 58 is also held by bar 59 but is closer to the axis than the contacts 56 and 57. The contacts 56 and 57 both engage, simultaneously, at spaced apart contact zones Z3, Z4, the circle 60 of studs secured to, and extending through, the base member 51. The contact 58 engages the ring 61 secured to base member 51 inside the circle 60 of studs. The circle 60 of studs and the ring 61 are concentric with their center on axis B of rotor shaft 53.

Figure 12:
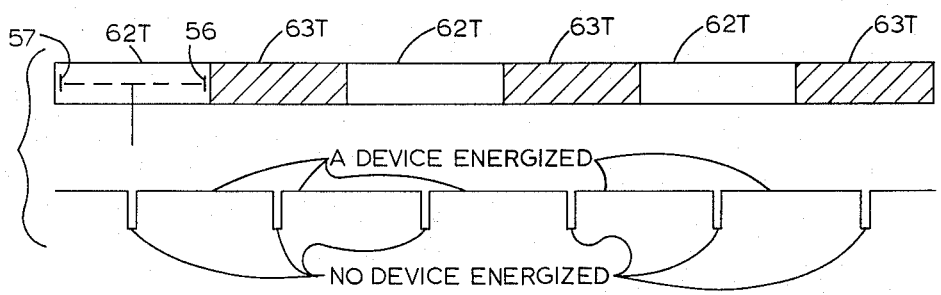
FIG. 12 is a schematic diagram showing the switch contacts and studs of the switch of FIGS. 9, 10, 11, and showing the periods when circuit branches through the switch are closed.

The circle of studs 60 comprise studs of different size. Every other stud 62 is slightly larger than alternate studs 63. The smaller studs 63 are all connected, respectively, by conductors (some 64A, 64B, 64C, 64D, 64E of which are shown) to one side the devices (some 65A, 65B, 65C, 65D, of which are shown). The other side of the devices are connected by conductor 66 to one side of battery 67. The other side of the battery 67 is connected to ring 61. Since the studs 63 are connected in circuit with the battery, these studs are "live;" the studs 62, which are slightly larger than the studs 63, are not connected to the battery nor into the network of the switching apparatus. Thus, when either contact 56 or 57 is on a live stud (as shown in solid lines in FIG. 11), a circuit including the device connected to that stud, the battery, ring 61, contact 58, bar 59, and contact 56 or 57 (whichever is engaged with the live stud), is made to energize the device. Whenever both contacts are engaged with one of the "dead" studs 63 (as shown in dotted lines in FIG. 11), no device is energized. As shown in FIG. 12, the devices are energized discretely and is succession with briefer intervals between energization of the devices when no device is energized.

What is claimed is:
1. Switching apparatus comprising an electrical network having a rotary switch, said rotary switch having a housing, a plurality of stationary studs mounted in said housing, a switch element rotatably mounted in said housing for rotation about an axis and engagement with the studs, said studs positioned in two concentric circles around said axis, every other stud in each circle electrically connected into said network and alternate studs in each circle electrically disconnected therefrom, the disconnected studs in one circle in staggered and overlapping relation to the disconnected studs in the other circle, said rotatable switch element electrically connected into said network and having two radially aligned contact zones, respectively, for the two circles of studs, the two contact zones in simultaneous stud engagement in the switch continuously during rotation of said rotatable element, said contact zones defining a closed circuit branch with connected studs when engaged therewith and defining an open circuit branch with disconnected studs when engaged therewith.

2. Switching apparatus comprising an electrical network having a rotary switch, said rotary switch having a housing, a plurality of stationary studs mounted in said housing, a switch element rotatably mounted in said housing for rotation about an axis and engagement with the studs, said studs positioned in two concentric circles around said axis, every other stud in each circle electrically connected into said network and alternate studs in each circle electrically disconnected therefrom, the connected studs in one circle in staggered and overlapping relation to the connected studs in the other circle, said rotatable switch element having two radially aligned contact zones, respectively, for the two circles, said two contact zones in simultaneous stud engagement continuously during rotation of said rotatable element, said rotatable switch element and the contact zones thereof defining a closed circuit branch when both contact zones are engaged with connected studs, and defining an open circuit branch when either contact zone is engaged with a disconnected stud.

3. Switching apparatus comprising an electrical network having a rotary switch, said rotary switch having a housing and having a switch element rotatably mounted in said housing for rotation about an axis, said housing having a plurality of stationary studs mounted therein and arrayed in a circle around said axis, every other stud electrically connected into said network and alternate studs disconnected therefrom, said rotatable switch element connected into said network and having a pair of circumferentially spaced apart contact zones in simultaneous and continuous stud engagement as said rotatable element swings about said axis.

4. The switching apparatus according to claim 3 in which said spaced apart contact zones are defined by fingers on the rotatable switch element.

References Cited by the Examiner
UNITED STATES PATENTS

| | | | |
|---|---|---|---|
| 2,240,997 | 5/1941 | McMaster | 200—11 |
| 2,424,745 | 7/1947 | Doucette | 200—11 |
| 2,570,960 | 10/1951 | Lutsky et al. | 200—11 |
| 2,848,568 | 8/1958 | Berkeley et al. | 200—11 |
| 3,005,882 | 10/1961 | White | 200—11 |
| 3,140,364 | 7/1964 | Swanke et al. | 200—11 |

ROBERT K. SCHAEFER, *Primary Examiner.*
KATHLEEN H. CLAFFY, *Examiner.*
J. R. SCOTT, *Assistant Examiner.*